3,180,848
STABILIZATION OF VINYL HALIDE RESIN COMPOSITIONS CONTAINING IRON-BEARING ASBESTOS
Henry R. Thompson, Middle Village, N.Y., assignor to Nopco Chemical Company, Newark, N.J., a corporation of New Jersey
No Drawing. Filed Dec. 23, 1959, Ser. No. 861,460
20 Claims. (Cl. 260—41)

The present invention relates to the stabilization of vinyl halide resin compositions which contain iron-bearing asbestos.

Asbestos has been used with vinyl halide resins as a filler in connection with the preparation of floor tile. However, almost all of the asbestos so used contains iron usually in the form of its oxides. As a result of the presence of this iron, degradation of the resin composition is greatly increased or accelerated. This is true not only during milling and molding procedures, but also during the use of the product. Such degradation is characterized by brittleness of the product as well as by a weakened tensile strength. Furthermore, when degradation occurs during the milling procedures, uniformity of color becomes impossible to achieve.

Various stabilizers have been proposed in order to arrest the degradation of these resin compositions. Of especial interest have been lead stabilizers; however, these materials are poisonous from the standpoint of the fabricator and also bring about staining or darkening of the final product due to reaction with hydrogen sulfide of the atmosphere which brings about formation of lead sulfide. Organic monocarboxylic acids such as benzoic and salicylic acids have been suggested in Patent No. 2,837,490, Hecker, June 3, 1958. However, many of these materials sublime at temperatures used in the processing of the resin thereby inducing blisters and other blemishes upon the surface of the milled product.

Accordingly, it is an object of the present invention to provide for heat and light stable asbestos-containing vinyl halide resin compositions by preventing or reducing degradation of these compositions which is caused by the iron present in the asbestos. It is another object to provide for the stabilization of these compositions during milling and molding procedures at which time elevated temperatures are employed. A further object is to stabilize these compositions during their use as floor tile structures. A still further object is to obviate staining or discoloration of the resin due to reaction between sulfur containing materials present in the atmosphere and many prior art stabilizers. Further objects will become apparent from the detailed description given hereinafter. It is intended, however, that the detailed description and specific examples do not limit the invention, but merely indicate the preferred embodiments of the invention since various changes and modifications within the scope of the invention will become apparent to those skilled in the art.

I have unexpectedly discovered that the above and other objects can be successfully realized by the incorporation of phthalic anhydride into asbestos-containing vinyl halide resin compositions wherein the asbestos is an iron-bearing asbestos. Thus, I have discovered that phthalic anhydride is an excellent stabilizer which prevents or reduces the degradation of asbestos-containing vinyl halide resin compositions due to the iron content of the asbestos filler.

It is known according to Patent No. 2,394,417, Yngve, February 5, 1946, to incorporate phthalic anhydride into vinyl resins which contain high boiling softening agents or plasticizers in order to retard unpleasant odor formation. It is also known that phthalic anhydride does not stabilize vinyl halide resins against degradation. In fact, the above patent calls for metal oxides and salts or organo-metallic compounds which serve as stabilizers against discoloration or decomposition by the action of heat or light. However, I have discovered that this same anhydride when present in a system comprising a vinyl halide resin and an iron-containing asbestos does in some manner arrest and prevent or reduce degradation of the resin composition by the iron which would occur under fabrication conditions as well as under conditions of normal usage.

Although my preferred stabilizer is phthalic anhydride since I am able to achieve the best results with this material, I have also discovered several other anhydrides, chiefly aromatic anhydrides, which to varying extents display properties making them useful as stabilizers in vinyl-asbestos systems. These materials are dimethyl butenyl phthalic anhydride, trimellitic anhydride, Nadic anhydride (endo-cis-bicyclo (2.2.1) hept-5-ene-2,3 dicarboxylic anhydride), tetrahydrophthalic anhydride, hexahydrophthalic anhydride, pyromellitic anhydride, trimellitic double anhydride and mixtures thereof as well as with phthalic anhydride.

It is well known in the art that some degree of improvement in the stabilization of resin compositions containing iron-bearing asbestos can be obtained by incorporation of minor amounts, based on the weight of the asbestos, of aliphatic polyhydric alcohols, epoxy-containing materials and metal organic salts. However, I have also found that phthalic anhydride, and to varying extents the other anhydrides heretofore enumerated, when added to these prior art compositions bring about enhanced stabilization.

Exemplary of many of these prior art polyhydric alcohols, epoxy-containing materials and metal organic salts are those set forth in Patents Nos. 2,459,746, Radcliffe, January 18, 1949; 2,564,194, De Nie et al., August 14, 1951; 2,671,064, Cowell et al., March 2, 1954; 2,711,401, Lally, June 21, 1955 and 2,734,881, Lally et al., February 14, 1956, and include aliphatic polyhydric alcohols, esters of aliphatic polyhydric alcohols and ethers of aliphatic polyhydric alcohols having from 2 to 9 hydroxyl groups such as ethylene glycol, diethylene glycol, glycerol, pentaerythritol, dipentaerythritol, sorbitol, glyceryl monostearate; epoxy-containing materials such as epichlorohydrin, styrene oxide epoxidized oils such as, epoxidized soybean oil, the hexyl and octyl esters of epoxystearic acid, epoxy resins derived from the reaction between epichlorohydrin and 2,2-bis(4-hydroxyphenyl) propane such as the commerically available resins designated as Epon 828, Epon 864 and Epon 1001 and metal organic salts wherein the metal portion thereof is a metal of Group II of the Periodic Table such the the zinc, calcium, cadmium and barium salts of 2-ethyl-hexoic acid, naphthenic acids, rosin acids, acetic acid, propionic acid, ricinoleic acid, oleic acid, stearic acid, benzoic acid, and salicyclic acid such as zinc 2-ethyl-hexoate, zinc ricinoleate, cadmium naphthenate and barium 2-ethyl hexoate. It should be kept in mind that many of the metal organic salts indicated above are metal soaps. Since metal soaps as calcium stearate and zinc oleate are in fact lubricating agents, it is not preferred to use them in these formulations because of high lubrication imparted to the formulation which brings about poor adherence to the rolls during milling. These prior art materials, i.e., the aliphatic polyhydric alcohols, epoxy-containing materials and metal organic salts are generally used in amounts up to about 10% by weight of the asbestos.

Generally speaking, most vinyl halide resins when used to prepare floor tile are mixed with from about 25 to 300 parts by weight of asbestos per 100 parts by weight of the resin. Commercial asbestos which is used as a filler in floor tiles contains from about 0.2% to about 5% by weight of iron calculated as Fe. While varying amounts of phthalic anhydride or other anhydride heretofore mentioned can be incorporated in the resin-asbestos compositions in order to prevent or reduce degradation due to the presence of the iron, I have found that amounts of from about 0.5% to about 20% by weight of these anhydrides and dicarboxylic acids based on the weight of the asbestos when incorporated into the asbestos-containing resin composition are particularly effective. It should be recognized, however, that although effective stabilization is achieved using the higher quantities of stabilizer, e.g., 10% or more, the improvement or efficiency in stabilizing activity is not necessarily proportional to the quantity of stabilizer. Preferably there is present from about 1% to about 10% by weight of these materials based on the weight of the asbestos. The proportions of stabilizer just recited are intended to cover the stabilization of the resin-asbestos system when the resin is used with most commerical iron-bearing asbestos materials. Of course, where the iron content of the asbestos varies widely, then the amounts of stabilizer can be adjusted accordingly to assure stabilization. Such is deemed to be clear from this disclosure. When my stabilizers are used with formulations containing an aliphatic polyhydric alcohol, epoxy-containing material or metal organic salt, these proportions can be the same as indicated previously, i.e., from about 0.5% to about 20% by weight based upon the weight of the asbestos.

Exemplary of the vinyl halide resins which can be used in conjunction with the iron-containing asbestos filler are the following: homopolymers of vinyl chloride, vinylbromide and vinylidene chloride; copolymers of vinyl and vinylidene halides such as vinyl chloride, vinyl bromide and vinylidene chloride which contain in an amount up to about 20% by weight of the copolymer of at least one ethylenically unsaturated monomer copolymerizable therewith such as vinyl acetate, styrene, diethyl maleate, maleic anhydride, acrylic acid esters, etc., and copolymers of vinyl chloride and vinylidene chloride in which the vinylidene chloride is present in amounts up to about 20% by weight of the total.

Various conventional materials which can be incorporated into the asbestos-containing vinyl halide compositions are additional fillers such as calcium carbonate, silica, talc, clay and diatomaceous earth; pigments such as chrome oxide green, titanium dioxide, phthalocyanine blue; plasticizers such as tricresyl phosphate, dibutyl phthalate, dioctyl phthalate, epoxidized soyabean oil, etc.; lubricants such as the metal soaps, calcium stearate and barium stearate, waxes such as paraffin wax, carnauba wax and montan wax and refined oils and related materials such as mineral oil, stearic acid and lauric acid. The use of these ancillary materials is well known to those skilled in the art and hence the above enumerated ingredients are not to be taken in a limiting sense.

The preparation of resin-asbestos compositions is well known in the art. The ingredients, i.e., resin, asbestos, stabilizer and other ancillary ingredients when used are mixed together and then calendered, milled or pressed at temperatures of from about 175° F. to about 350° F. in order to prepare sheets of the resin. The compositions described in the following examples were prepared and tested for stabilization in accordance with the following general procedure. Milling times and temperatures and oven times and temperatures, where necessary are set forth in each example.

(1) The ingredients were blended together in a Hobart type mixer.

(2) The resulting blend, referred to as stock, was then dropped on to a two roll mill heated at a temperature between 175° F. and 350° F.

(3) After the stock had been fluxed, banded and blended for at least a five minute period on the mill, it was removed as a 20 mil sheet.

(4) Samples of the 20 mil sheet were then placed in a circulating air oven at a temperature between 250° F. and 350° F.

Since color change is the principal change indicative of the extent of degradation in vinyl resin systems, such is utilized as an indication of stabilization efficiency. In this manner, color changes of stabilized samples are compared either visually or optically with a blank or other standard. In most of the examples herein, color change was determined by measuring the diffuse reflectance of the surfaces of the various vinyl resin samples with a Photovolt Photoelectric Reflection Meter, Model 610 (manufactured and sold by the Photovolt Corporation, New York, N.Y.) using a green filter and using the white standard which is supplied with the instrument as 100% reflectance. A determination of the diffuse reflectance of the surface of a material gives an accurate determination of the lightness or darkness of the surface. A dark or discolored surface resulting from degradation will tend to absorb light and hence have a low diffuse reflectance. A light colored surface will reflect light and hence have a high diffuse reflectance. Thus, all other variables being equal or relatively so, e.g., the texture of the respective surfaces of the materials to be compared, a material having a lighter colored surface will have a higher diffuse reflectance and hence less degradation than a material having a darker or discolored surface. In the following examples, the reflectance determinations where disclosed, were made upon the samples after removal from the mill or oven depending upon the treatment given to the samples. Where no numerical value is specified for a reflectometer reading, this indicated that the sample was so badly discolored or cracked, that no reading could be obtained.

In Examples I and II, polyvinyl chloride compositions containing a plasticizer component in amounts of 33% and 23% respectively by weight of the combined weight of resin and plasticizer were prepared for the purpose of demonstrating that phthalic anhydride does not stabilize a polyvinyl halide resin.

*Example I*

The following ingredients were mixed together in a stainless steel beaker:

| | Pts. by wt. |
|---|---|
| Polyvinylchloride | 100 |
| Di-2-ethylhexyl phthalate | 45 |
| Epoxidized soyabean oil | 5 |
| Stearic acid | 0.25 |

One portion was used as a control and to another portion, 4 parts by weight of phthalic anhydride were added. Each portion was dumped on a two roll rubber mill which was heated to a temperature of 340° F. and then banded and cut with a knife, i.e., folded back and forth on the mill. At the end of 5 minutes each sample thus treated was found to have stuck to the mill thus indicating severe degradation in both cases.

*Example II*

The following ingredients were mixed together in a stainless steel beaker:

| | Pts. by wt. |
|---|---|
| Vinylchloride-vinylacetate copolymer | 100 |
| Di-2-ethylhexyl phthalate | 25 |
| Epoxidized soyabean oil | 5 |
| Titanium dioxide | 25 |
| Calcium carbonate | 340 |
| Phthalic anhydride | 10 |

The mixture was then dumped on a two roll rubber mill and heated to a temperature of 300° F. It was banded and cut with a knife, i.e., folded back and forth on the rolls for 5 minutes. The material was then sheeted out to 20 mils and removed. Samples were then laid on Pyrex glass plates and placed in a circulating air oven at a temperature of 325° F. for 30, 60, 90, 120, 130 and 180 minutes respectively. After the removal, the samples were cut into one inch squares and mounted on cards for visual observation. A tan hue was observed starting with the sample heated to 60 minutes.

A control was also prepared and tested in the same manner except that no phthalic anhydride was used. A tan hue was observed after heating for 120 minutes, thus indicating that the phthalic anhydride not only did not stabilize the resin, but actually increased the rate of degradation in the absence of iron-containing asbestos.

The remaining examples illustrate various embodiments of the present invention. The general procedure for preparing and testing the samples has been set forth above, hence, only the formulations, reflectometer data and milling and oven times and temperatures are set forth. All parts given are parts by weight.

*Example III*

| Formulation | A (parts) | B (parts) |
|---|---|---|
| VYHH [1] | 100 | 100 |
| Dioctyl phthalate | 25 | 25 |
| Titanium dioxide | 25 | 25 |
| York whiting [2] | 150 | 150 |
| Asbestos 7R [3] | 150 | 150 |
| Phthalic anhydride | | 7.5 |

REFLECTANCE DATA

| Formulation | A | | | B | | |
|---|---|---|---|---|---|---|
| Time on mill maintained at 300° F. (minutes) | 5 | 10 | 15 | 5 | 10 | 15 |
| Readings | 50 | 20 | | 76 | 62.5 | 52.5 |

[1] A copolymer containing 83% by wt. of vinyl chloride and 17% by wt. of vinyl acetate.
[2] Calcium carbonate.
[3] Contains 2% by wt. of Fe (Johns-Manville).

Examples IV, V and VI demonstrate that even in vinyl-asbestos systems which contain stabilizing ingredients such as epoxy-containing materials and polyhydric alcohols, the addition of phthalic anhydride still brings about enhanced stabilization.

*Example IV*

| Formulation | A (parts) | B (parts) |
|---|---|---|
| VYHH | 100 | 100 |
| Dioctyl phthalate | 25 | 25 |
| Titanium dioxide | 25 | 25 |
| York whiting | 150 | 150 |
| Asbestos 7R | 150 | 150 |
| Epoxidized Soyabean oil | 5 | 5 |
| Phthalic anhydride | | 7.5 |

REFLECTANCE DATA

| Formulation | A | | | B | | |
|---|---|---|---|---|---|---|
| Time on mill maintained at 300° F. (min.) | 5 | 15 | 25 | 5 | 15 | 25 |
| Readings | 64 | 58.5 | | 80.5 | 79.5 | 77 |

*Example V*

| Formulation | A (parts) | B (parts) |
|---|---|---|
| VYHH | 100 | 100 |
| Dioctyl phthalate | 25 | 25 |
| Titanium dioxide | 25 | 25 |
| York whiting | 150 | 150 |
| Asbestos 7R | 150 | 150 |
| Pentaerythritol | 5 | 5 |
| Phthalic anhydride | | 6 |

REFLECTANCE DATA

| Formulation | A | B |
|---|---|---|
| Readings after 5 min. on mill at 320°F | 77.5 | 80.5 |
| Readings after 5 min. on mill at 320°F. and 30 min. in oven at 325°F | 22.5 | 71 |

*Example VI*

| Formulation | A (parts) | B (parts) |
|---|---|---|
| Geon 101 [1] | 100 | 100 |
| Dioctyl phthalate | 27 | 27 |
| Titanium dioxide | 25 | 25 |
| York whiting | 140 | 140 |
| Asbestos 7R | 200 | 200 |
| Epon 828 [2] | 10 | 10 |
| Phthalic anhydride | | 4 |

REFLECTANCE DATA

| Formulation | A | B |
|---|---|---|
| Readings after 5 min. on mill at 340° F | 47 | 67 |
| Readings after 5 min. on mill at 340° F. and 30 min. in oven at 350° F | | 55.5 |

[1] Polyvinyl chloride.
[2] Resin obtained from epichlorohydrin and 2,2-bis(4-hydroxy phenyl) propane having a M.P. of 8–12° C. and an epoxy equivalent of 196–210 (Shell Chemical Co.)

The following three examples illustrate various vinyl resins which can be successfully stabilized.

*Example VII*

| Formulation | A (parts) | B (parts) |
|---|---|---|
| Geon 101 | 100 | 100 |
| Dioctyl phthalate | 50 | 50 |
| Titanium dioxide | 25 | 25 |
| York whiting | 315 | 315 |
| Asbestos 7R | 25 | 25 |
| Phthalic anhydride | | 2 |

REFLECTANCE DATA

| Formulation | A | B |
|---|---|---|
| Readings after 5 min. on mill at 340° F | 59.5 | 72.5 |

*Example VIII*

| Formulation | A (parts) | B (parts) |
|---|---|---|
| Vinylidene chloride-vinylchloride copolymer | 100 | 100 |
| Dioctyl phthalate | 45 | 45 |
| Titanium dioxide | 25 | 25 |
| York whiting | 140 | 140 |
| Asbestos 7R | 200 | 200 |
| Epoxidized soyabean oil | 5 | 5 |
| Phthalic anhydride | | 8 |

REFLECTANCE DATA

| Formulation | A | B |
|---|---|---|
| Readings after 5 min. on mill at 300° F | 46.5 | 75 |
| Readings after 5 min. on mill at 300° F. and 30 min. in oven at 350° F | | 50.5 |

*Example IX*

| Formulation | A (parts) | B (parts) |
|---|---|---|
| Geon 101 | 100 | 100 |
| Dioctyl phthalate | 25 | 25 |
| Titanium dioxide | 25 | 25 |
| York whiting | 240 | 240 |
| Asbestos 7R | 100 | 100 |
| Epoxidized soyabean oil | 5 | 5 |
| Phthalic anhydride | | 4 |

REFLECTANCE DATA

| Formulation | A (parts) | B (parts) |
|---|---|---|
| Readings after 5 min. on mill at 340° F | 44 | 80.5 |
| Readings after 5 min. on mill at 340° F. and 30 min. in oven at 350° F | | 57 |

In this example, the effectiveness of trimellitic anhydride as a stabilizer is shown.

| Formulation | A (parts) | B (parts) | C (parts) |
|---|---|---|---|
| Vinylchloride-vinylacetate copolymer | 100 | 100 | 100 |
| Dioctyl phthalate | 25 | 25 | 25 |
| Titanium dioxide | 25 | 25 | 25 |
| York whiting | 140 | 140 | 140 |
| Asbestos 7R | 200 | 200 | 200 |
| Epoxidized soyabean oil | 5 | 5 | 5 |
| Trimellitic anhydride | | 8 | |
| Phthalic anhydride | | | 8 |

REFLECTANCE DATA

| Formulation | A | | | B | | | C | | |
|---|---|---|---|---|---|---|---|---|---|
| Time (in min.) in oven at 325° F. after milling for 5 min. at 300° F. | 0 | 90 | 180 | 0 | 90 | 180 | 0 | 90 | 180 |
| Readings | 52.5 | | | 71.5 | 67 | 60 | 73.5 | 68.5 | 63.5 |

In the following two examples, various proportions of phthalic anhydride are used both alone and in conjunction with an epoxy-containing material. These examples illustrate that although effective stabilization is achieved, the improvement or efficiency in stabilizing activity is not necessarily proportional to the amount of stabilizer when larger quantities are used.

*Example XI*

| Formulation | A (parts) | B (parts) | C (parts) | D (parts) |
|---|---|---|---|---|
| VYHH | 100 | 100 | 100 | 100 |
| Dioctyl phthalate | 25 | 25 | 25 | 25 |
| Titanium dioxide | 25 | 25 | 25 | 25 |
| York whiting | 150 | 150 | 150 | 150 |
| Asbestos 7R | 150 | 150 | 150 | 150 |
| Phthalic anhydride | | 2.5 | 7.5 | 15 |

REFLECTANCE DATA

| Formulation | A | B | C | D |
|---|---|---|---|---|
| Readings after 5 min. on mill at 300° F. | 47 | 62 | 74.5 | 76.5 |

*Example XII*

| Formulation | A (parts) | B (parts) | C (parts) | D (parts) |
|---|---|---|---|---|
| VYHH | 100 | 100 | 100 | 100 |
| Dioctyl phthalate | 25 | 25 | 25 | 25 |
| Titanium dioxide | 25 | 25 | 25 | 25 |
| York whiting | 150 | 150 | 150 | 150 |
| Asbestos 7R | 150 | 150 | 150 | 150 |
| Epoxidized soyabean oil | 5 | 5 | 5 | 5 |
| Phthalic anhydride | | 1.5 | 6 | 15 |

*Example XII—Continued*

REFLECTANCE DATA

| Formulation | A | B | C | D |
|---|---|---|---|---|
| Readings after 5 min. on mill at 300° F. | 63.5 | 76 | 80 | 82 |
| Readings after 15 min. on mill at 300° F. | 57.5 | 66.5 | 78.5 | 77.5 |

*Example XIII*

In this example, the ratio of the quantities of the stabilizer, phthalic anhydride, and asbestos and hence the iron, was kept constant. Also, the amount of vinyl resin was held constant.

| Formulation | A (parts) | B (parts) | C (parts) | D (parts) | E (parts) | F (parts) |
|---|---|---|---|---|---|---|
| Geon 101 | 100 | 100 | 100 | 100 | 100 | 100 |
| Dioctyl phthalate | 25 | 25 | 25 | 25 | 25 | 25 |
| Titanium dioxide | 25 | 25 | 25 | 25 | 25 | 25 |
| York whiting | 315 | 315 | 240 | 240 | 140 | 140 |
| Asbestos 7R | 25 | 25 | 100 | 100 | 200 | 200 |
| Epoxidized soyabean oil | 5 | 5 | 5 | 5 | 5 | 5 |
| Phthalic anhydride | | 2 | | 4 | | 8 |

REFLECTANCE DATA

| Formulation | A | B | C | D | E | F |
|---|---|---|---|---|---|---|
| Readings after 5 min. on mill at 340° F. | 76.5 | 96 | 43.5 | 79 | 16 | 68 |

As the above data indicate, phthalic anhydride offers effective stabilization over the complete range of vinyl resin-asbestos proportions which are generally used in commercial applications.

Having described my invention, what I claim as new and desire to secure by Letters Patent is:

1. A composition of matter comprising a polyvinyl halide resin, from about 25 to 300 parts by weight of asbestos per 100 parts by weight of said resin, said asbestos being an iron containing asbestos, and as a stabilizer for said composition a material selected from the group consisting of phthalic anhydride, dimethyl butenyl phthalic anhydride, trimellitic anhydride, endo-cis-bicyclo (2.2.1) hept-5-ene-2,3 dicarboxylic anhydride, tetrahydrophthalic anhydride, hexahydrophthalic anhydride, pyromellitic anhydride, trimellitic double anhydride and mixtures thereof.

2. The composition of claim 1 in which said stabilizer is present in an amount of from about 0.5% to about 20% by weight of said asbestos.

3. The composition of claim 1 in which said stabilizer is present in an amount of from about 1.0% to about 10% by weight of said asbestos.

4. The composition of claim 1 in which said stabilizer is phthalic anhydride present in an amount of from about 0.5% to about 20% by weight of said asbestos.

5. A composition of matter comprising a chlorine containing resin selected from the group consisting of homopolymers and copolymers of vinyl chloride and vinylidene chloride, from about 25 to 300 parts by weight of asbestos per 100 parts by weight of said resin, said asbestos being an iron-containing asbestos, and as a stabilizer for said composition a material selected from the group consisting of phthalic anhydride, dimethyl butenyl phthalic anhydride, trimellitic anhydride, endo-cis-bicyclo (2.2.1) hept-5-ene-2,3 dicarboxylic anhydride, tetrahydrophthalic anhydride, hexahydrophthalic anhydride, pyromellitic anhydride, trimellitic double anhydride and mixtures thereof.

6. The composition of claim 5 in which said stabilizer is phthalic anhydride.

7. The composition of claim 5 in which said stabilizer is trimellitic anhydride.

8. The composition of claim 5 in which said stabilizer is present in an amount of from about 0.5% to about 20% by weight of said asbestos.

9. The composition of claim 5 in which said stabilizer is present in an amount of from about 1.0% to about 10% by weight of said asbestos.

10. The composition of claim 5 in which said stabilizer is phthalic anhydride present in an amount of from about 0.5% to about 20% by weight of said asbestos.

11. The composition of claim 5 in which said stabilizer is trimellitic anhydride present in an amount of from about 0.5% to about 20% by weight of said asbestos.

12. The composition of claim 10 in which the chlorine-containing resin is a homopolymer of vinyl chloride.

13. The composition of claim 10 in which the chlorine-containing resin is a homopolymer of vinylidene chloride.

14. The composition of claim 10 in which the chlorine-containing resin is a copolymer of vinyl chloride and at least one ethylenically unsaturated monomer copolymerizable therewith present in an amount up to about 20% by weight of said copolymer.

15. The composition of claim 1 in which there is present at least one member of the group consisting of epichlorohydrin, styrene oxide, epoxy resins and epoxidized oils present in an amount up to about 10% by weight of said iron-containing asbestos.

16. The composition of claim 1 in which there is present at least one member of the group consisting of aliphatic polyhydric alcohols, esters of aliphatic polyhydric alcohols and ethers of aliphatic polyhydric alcohols containing from 2 to 9 hydroxyl groups present in an amount up to about 10% by weight of said iron-containing asbestos.

17. The composition of claim 1 in which there is present at least one metal organic salt in which the metal portion thereof is a metal of Group II of the Periodic Table.

18. The composition of claim 5 in which there is present at least one member of the group consisting of epichlorohydrin, styrene oxide, epoxy resins and epoxidized oils present in an amount up to about 10% by weight of said iron-containing asbestos.

19. The composition in claim 5 in which there is present at least one member of the group consisting of aliphatic polyhydric alcohols, esters of aliphatic polyhydric alcohols and ethers of aliphatic polyhydric alcohols containing from 2 to 9 hydroxyl groups present in an amount up to about 10% by weight of said iron-containing asbestos.

20. The composition of claim 5 in which there is present at least one metal organic salt in which the metal portion thereof is a metal of Group II of the Periodic Table.

References Cited by the Examiner
UNITED STATES PATENTS

| | | | |
|---|---|---|---|
| 2,394,417 | 2/46 | Yngrie | 260—45.85 |
| 2,439,677 | 4/48 | Shapiro | 260—45.85 |
| 2,459,746 | 1/49 | Radcliffe | 260—45.95 |
| 2,564,194 | 8/51 | DeNie | 260—45.8 |
| 2,671,064 | 3/54 | Cowell et al. | 260—45.85 |
| 2,711,401 | 6/55 | Lally | 260—45.95 |
| 2,734,881 | 2/56 | Lally et al. | 260—45.95 |
| 2,837,490 | 6/58 | Hecker | 260—45.85 |
| 2,868,745 | 1/59 | Canarios | 260—45.85 |
| 2,943,070 | 6/60 | Hecker | 260—23 |

ALEXANDER H. BRODMERKEL, *Primary Examiner.*
DANIEL ARNOLD, LEON J. BERCOVITZ, *Examiners.*